(12) United States Patent
Gordon et al.

(10) Patent No.: US 11,521,189 B1
(45) Date of Patent: Dec. 6, 2022

(54) METHODS AND SYSTEMS FOR COLLECTING AND RELEASING VIRTUAL OBJECTS BETWEEN DISPARATE AUGMENTED REALITY ENVIRONMENTS

(71) Applicant: Worldpay Limited, London (GB)

(72) Inventors: Kevin Gordon, Essex (GB); Charlotte Spender, Tonbridge (GB)

(73) Assignee: Worldpay Limited, London (GB)

( * ) Notice: Subject to any disclaimer, the term of this patent is extended or adjusted under 35 U.S.C. 154(b) by 356 days.

(21) Appl. No.: 16/685,171

(22) Filed: Nov. 15, 2019

(51) Int. Cl.
*G06Q 20/12* (2012.01)
*G06Q 20/40* (2012.01)
*G06Q 20/36* (2012.01)
*G06F 3/0482* (2013.01)
*G06F 3/0486* (2013.01)
*G06F 3/04817* (2022.01)
*G06T 11/00* (2006.01)

(52) U.S. Cl.
CPC ......... *G06Q 20/123* (2013.01); *G06F 3/0482* (2013.01); *G06F 3/0486* (2013.01); *G06F 3/04817* (2013.01); *G06Q 20/36* (2013.01); *G06Q 20/40145* (2013.01); *G06T 11/00* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 9,064,023 | B2 * | 6/2015 | Hyndman | G06F 3/04815 |
| 10,664,903 | B1 * | 5/2020 | Haitani | H04W 88/02 |
| 10,726,435 | B2 * | 7/2020 | Andon | H04W 4/021 |
| 10,885,712 | B2 * | 1/2021 | Elangovan | H04N 7/183 |
| 2014/0267409 | A1 * | 9/2014 | Fein | G06F 3/011 |
| | | | | 345/633 |
| 2014/0282162 | A1 * | 9/2014 | Fein | G06F 3/013 |
| | | | | 715/769 |
| 2016/0026253 | A1 * | 1/2016 | Bradski | H04N 13/167 |
| | | | | 345/8 |
| 2018/0150831 | A1 * | 5/2018 | Dolan | G06Q 20/367 |
| 2018/0349703 | A1 * | 12/2018 | Rathod | A63F 13/213 |
| 2019/0107935 | A1 * | 4/2019 | Spivack | G06T 13/40 |
| 2019/0228450 | A1 * | 7/2019 | Waldron | H04L 67/306 |
| 2019/0354660 | A1 * | 11/2019 | Fong | G06F 21/32 |
| 2020/0066013 | A1 * | 2/2020 | DeLuca | G06T 11/60 |
| 2020/0409511 | A1 * | 12/2020 | Cowburn | G06F 3/04842 |

FOREIGN PATENT DOCUMENTS

WO WO-2014031899 A1 * 2/2014 ............ H04N 21/812

* cited by examiner

*Primary Examiner* — Henry Orr

(74) *Attorney, Agent, or Firm* — Bookoff McAndrews, PLLC

(57) ABSTRACT

Methods and systems are disclosed for collecting and releasing virtual objects between disparate augmented reality environments. One method comprises receiving user selection to collect an object in a first environment displayed on a user device at a first time. A search request may then be transmitted to a content server from which a virtual object corresponding to the collected object is received in response. The virtual object may be stored in a user library associated with a user identifier of the user. When a second environment is displayed on the user device, the virtual object may be added to the second environment in response to receiving user selection to add the virtual object and determining that the user is associated with the user identifier.

20 Claims, 10 Drawing Sheets

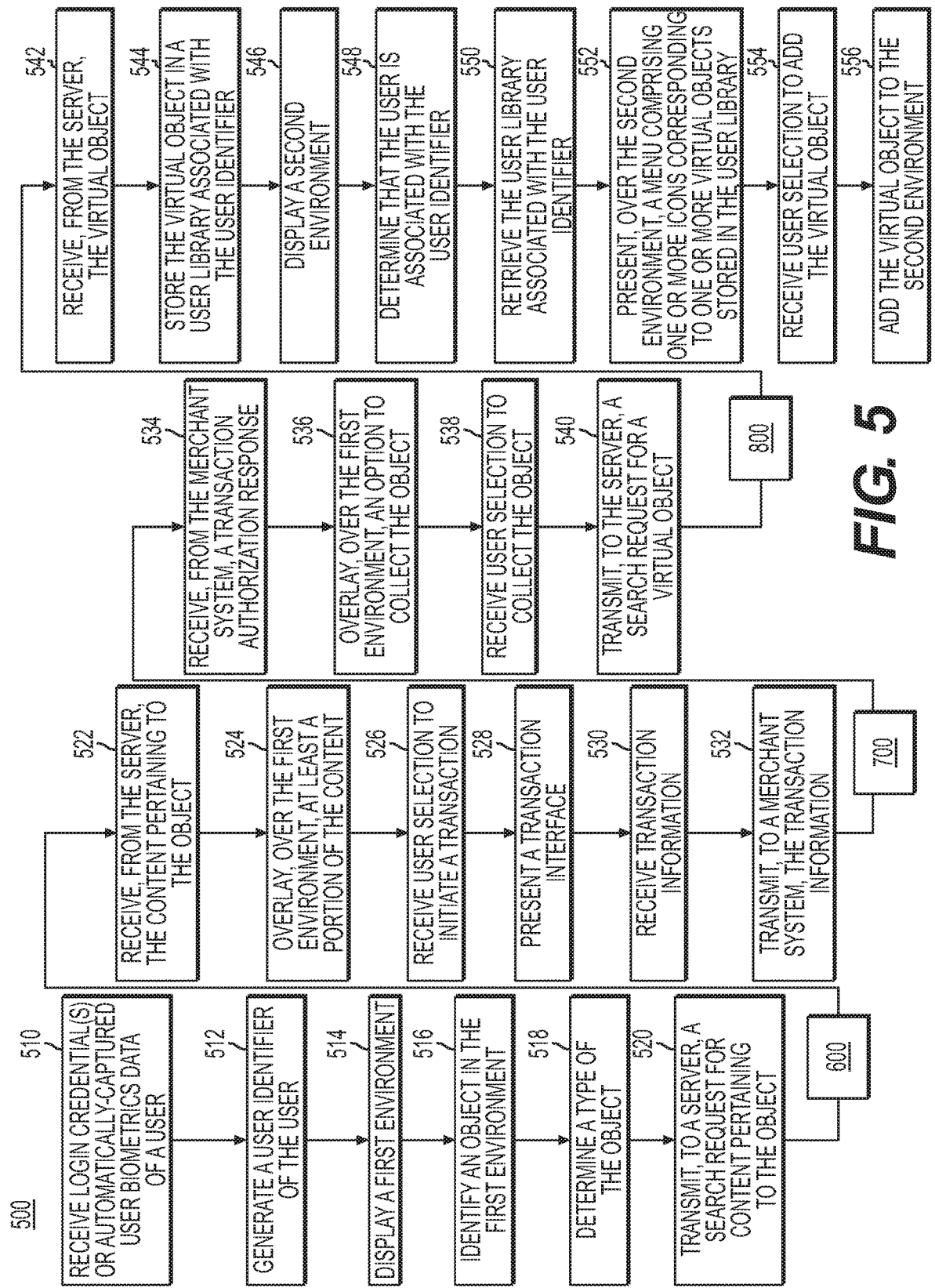

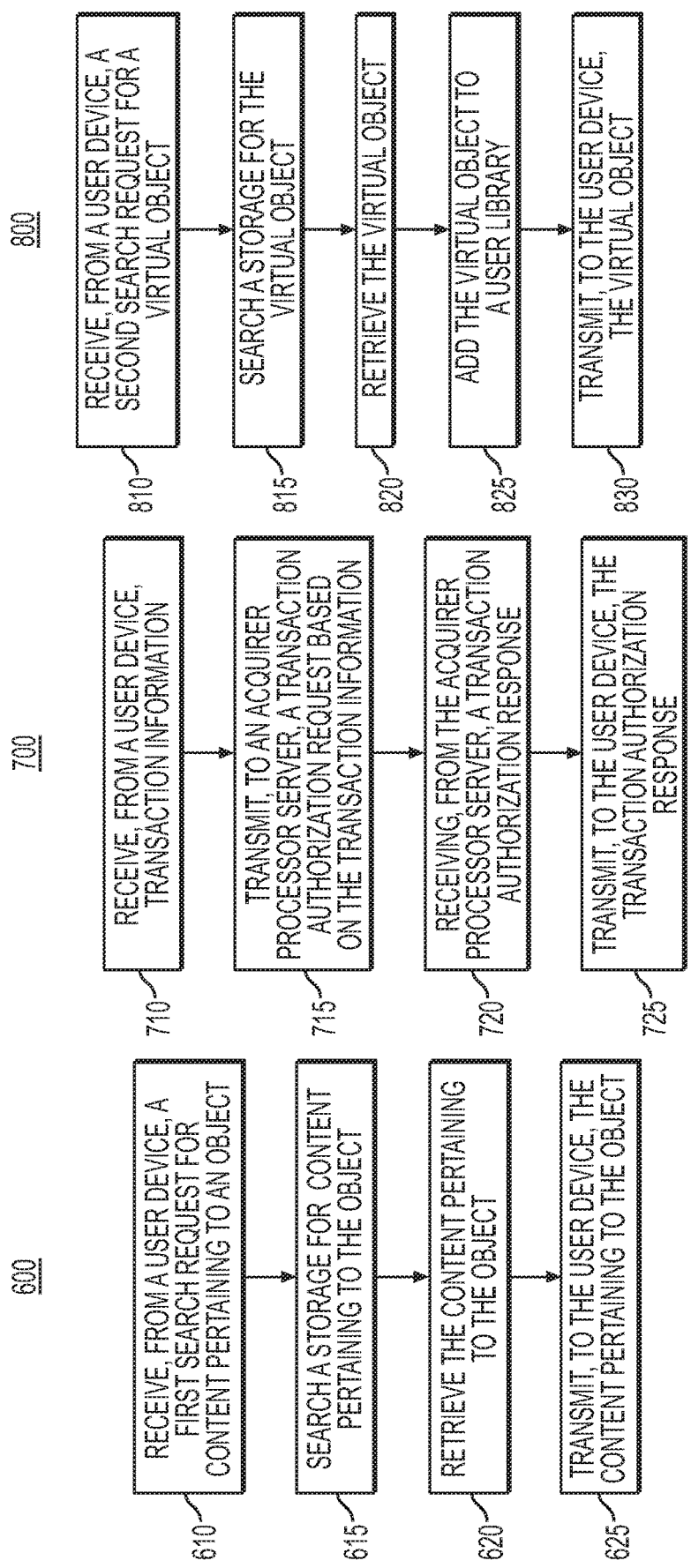

METHODS AND SYSTEMS FOR COLLECTING AND RELEASING VIRTUAL OBJECTS BETWEEN DISPARATE AUGMENTED REALITY ENVIRONMENTS

TECHNICAL FIELD

Various embodiments of the present disclosure relate generally to augmented reality user interfaces and, more particularly, to enabling electronic transactions and presenting virtual objects across disparate augmented reality environments.

BACKGROUND

Enhanced portability of consumer electronics with sophisticated graphics and computing capabilities (e.g., smart phones, tablets, and the like) have expanded the activities a user can engage in using those portable devices. The advancements in technologies have also brought science fiction into reality. For instance, a variety of sensing capabilities of portable devices can be utilized to further enhance the users' augmented reality experiences.

Augmented reality (AR) is the process of adding computer-supplied content, including images, video, text, and other data as layers over displayed images of the real world. For example, when a portable device captures an image or video of a scene including objects, one or more applications installed on the device can add information about the objects or other related contents over the displayed scene to enhance the user's experience. The user may utilize the overlaid information and contents to make informed decisions and/or to generate personal entertainment.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for collecting and releasing virtual objects between disparate augmented reality (AR) environments, comprising: generating a user identifier of a user; displaying, at a first time, a first environment comprising an object; receiving user selection to collect the object; transmitting, to an AR content server, a search request for a virtual object corresponding to the object; receiving, from the AR content server, the virtual object; storing the virtual object in a user library associated with the user identifier; displaying, at a second time, a second environment; determining that the user is associated with the user identifier; receiving user selection to add the virtual object to the second environment; and superimposing the virtual object over the second environment.

One embodiment provides a system for collecting and releasing virtual objects between disparate augmented reality (AR) environments. The system may comprise one or more processors; and a data storage comprising instructions which, when executed by the one or more processors, cause the one or more processors to perform a method comprising: generating a user identifier of a user; displaying, at a first time, a first environment comprising an object; receiving user selection to collect the object; transmitting, to an AR content server, a search request for a virtual object corresponding to the object; receiving, from the AR content server, the virtual object; storing the virtual object in a user library associated with the user identifier; displaying, at a second time, a second environment; determining that the user is associated with the user identifier; receiving user selection to add the virtual object to the second environment; and superimposing the virtual object over the second environment.

One embodiment provides a non-transitory computer readable medium for collecting and releasing virtual objects between disparate augmented reality (AR) environments. The non-transitory computer readable medium may store instructions which, when executed by one or more processors, cause the one or more processors to perform a method comprising: generating a user identifier of a user; displaying, at a first time, a first environment comprising an object; receiving user selection to collect the object; transmitting, to an AR content server, a search request for a virtual object corresponding to the object; receiving, from the AR content server, the virtual object; storing the virtual object in a user library associated with the user identifier; displaying, at a second time, a second environment; determining that the user is associated with the user identifier; receiving user selection to add the virtual object to the second environment; and superimposing the virtual object over the second environment.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 is a flowchart of an exemplary method of collecting and releasing a virtual object between disparate environments, according to one aspect of the present disclosure.

FIG. 6 is a flowchart of an exemplary method of processing a search request received from an AR application at an AR content retrieval server, according to one aspect of the present disclosure.

FIG. 7 is a flowchart of an exemplary method of processing transaction information received from an AR application at a merchant system, according to one aspect of the present disclosure.

FIG. 8 is a flowchart of another exemplary method of processing a search request received from an AR application at an AR content retrieval server, according to one aspect of the present disclosure.

DETAILED DESCRIPTION OF EMBODIMENTS

Figure 1:
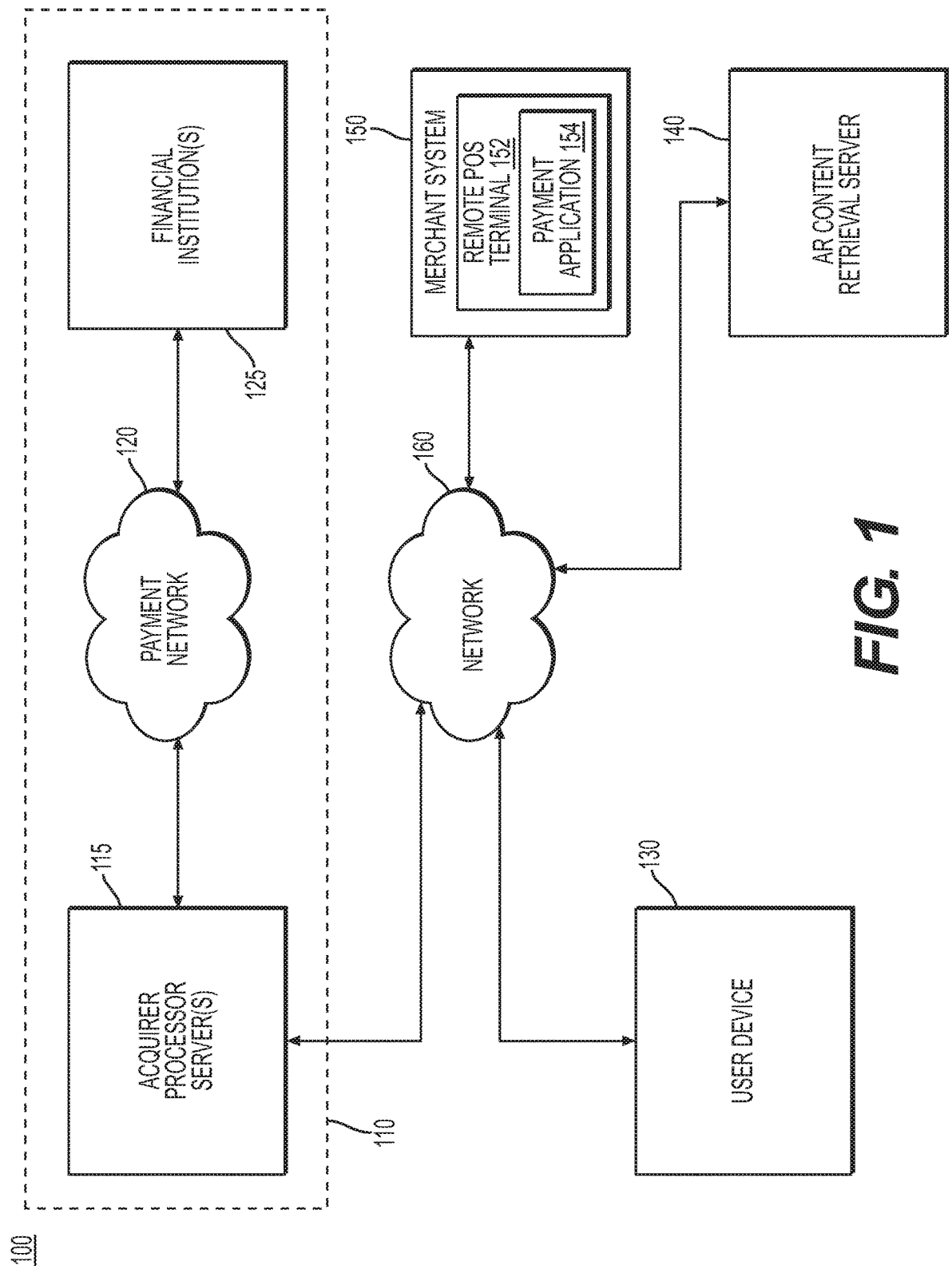
FIG. 1 depicts a block diagram of an augmented reality (AR)-enabled electronic transaction system, according to one aspect of the present disclosure.

Various embodiments of the present disclosure relate generally to augmented reality user interface and, more particularly, to enabling electronic transactions and presenting virtual objects across disparate augmented reality environments.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

For simplicity, the description that follows will be provided by reference to a "payment vehicle," "transaction vehicle," or a "payment card," which generally refers to any type of financial alternative to cash. As is to be clear to those skilled in the art, no aspect of the present disclosure is specifically limited to a specific type of payment vehicle or payment card. Therefore, it is intended that the following description encompasses the use of the present disclosure with many other forms of financial alternatives to cash, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), a digital wallet, or any other like financial transaction instrument. In any event, the payment vehicles described herein communicate account information (e.g., an account number or other account indicative information) during a purchase event and/or payment or credit transaction.

The disclosed methods and systems relate to unique augmented reality (AR) features that may provide a more immersive user experience at public or private establishments, such as, for example, zoos, museums, theme parks, amusement parks, theatres, and so on. Adding a layer of additional reality may provide users with rich experiences and information, and may motivate users to stay engaged with the experience for an extended period of time. The disclosed methods and systems may also enable the user to save augmented reality content for future use and/or personal entertainment. In one embodiment, a user may be able to view additional information about an object detected in an environment, "collect" the object, and add a virtual version of the collected object (i.e., virtual object) to a user library. To collect the object, an electronic payment interface may be activated within the AR environment through which the user may make payments in a convenient manner. The user may be able "drop" the virtual object onto another environment to re-observe the object and/or for continued entertainment in a new setting.

Referring now to the appended drawings, FIG. 1 depicts a block diagram of an AR-enabled electronic transaction system 100, according to one aspect of the present disclosure. In general, FIG. 1 depicts a payment environment 110, a merchant system 150, an AR content retrieval server 140, and user device 130, all connected via network 160. Network 160 may include the Internet, but may also include other networks such as a corporate WAN, cellular network, satellite network, or combination thereof, for example. The network 160 may be employed to enable data communications between the various entities illustrated in FIG. 1.

In the AR-enabled electronic transaction system 100 of FIG. 1, a consumer (i.e., a user), during a checkout process with a merchant 150 (i.e., merchant system 150), may make an electronic payment using a remote point of sale (POS) terminal 152. The remote POS terminal 152 may comprise a server consistent with or similar to the computing system depicted in FIG. 9, and may handle transactions that occur over the network 160 with the user device 130. The user device 130 may include, but may not be limited to, an AR consumer product (e.g., an AR headset, an AR eyewear, etc.), a smartphone, a mobile phone, a tablet computer, a laptop, a portable computer, a desktop computer, a smart watch, a wearable device, etc. The user device 130 may comprise a computing device consistent with or similar to the computing system depicted in FIG. 9. The remote POS terminal 152 may be in communication with the user device 130 over the network 160 and may provide an electronic payment interface to the user device 130, using payment application 154. The electronic payment interface may be provided in various formats. In one embodiment, the electronic payment interface may be a web page where a user of the user device 130 can provide payment vehicle information as well as the corresponding authentication data (e.g., PIN, password, CVV, answer to a secret question, biometrics data, etc.). In another embodiment, the electronic payment interface may be a web-based application through which a user can provide a payment vehicle (or payment vehicle information) as well as the corresponding authentication data. In yet another embodiment, the electronic payment interface may provide an installable mobile application to the user device 130, so that a user may use the mobile application to access an electronic payment interface to provide a payment vehicle (or payment vehicle information) as well as the corresponding authentication data.

The AR-enabled electronic transaction system 100 may also comprise an AR content retrieval server 140. As will be discussed in greater detail below, the AR content retrieval server 140 may store various contents that could augment the scene or environment displayed by the user device 130. For example, the user device 130 may capture and display an environment including one or more objects, and may request additional contents from the AR content retrieval server 140 to be presented over the displayed environment. The AR content retrieval server 140 may thus be configured to receive and process requests received from the user device 130, retrieve contents from a storage, and transmit the contents to the user device 130. To that end, the AR content retrieval server 140 may comprise a computing system consistent with, or similar to, that depicted in FIG. 9. The AR content retrieval server 140 may provide additional functionalities, which will be discussed in greater detail in the following sections.

Because merchant 150 generally can use a bank or financial institution that is different from that of the consumer, an acquirer processor server(s) 115 may handle the electronic transactions between the financial institution of the consumer and that of the merchant 150. Upon receiving a payment vehicle (or payment vehicle information) and the corresponding authentication data, the merchant system 150 (or the remote POS terminal 152 therein) may send a transaction authorization request by way of the network 160 to an acquirer processor server 115. The acquirer processor server 115 may then request, by way of payment network 120, an electronic transfer of funds to the financial institution 125 associated with the merchant 150.

Figure 9:
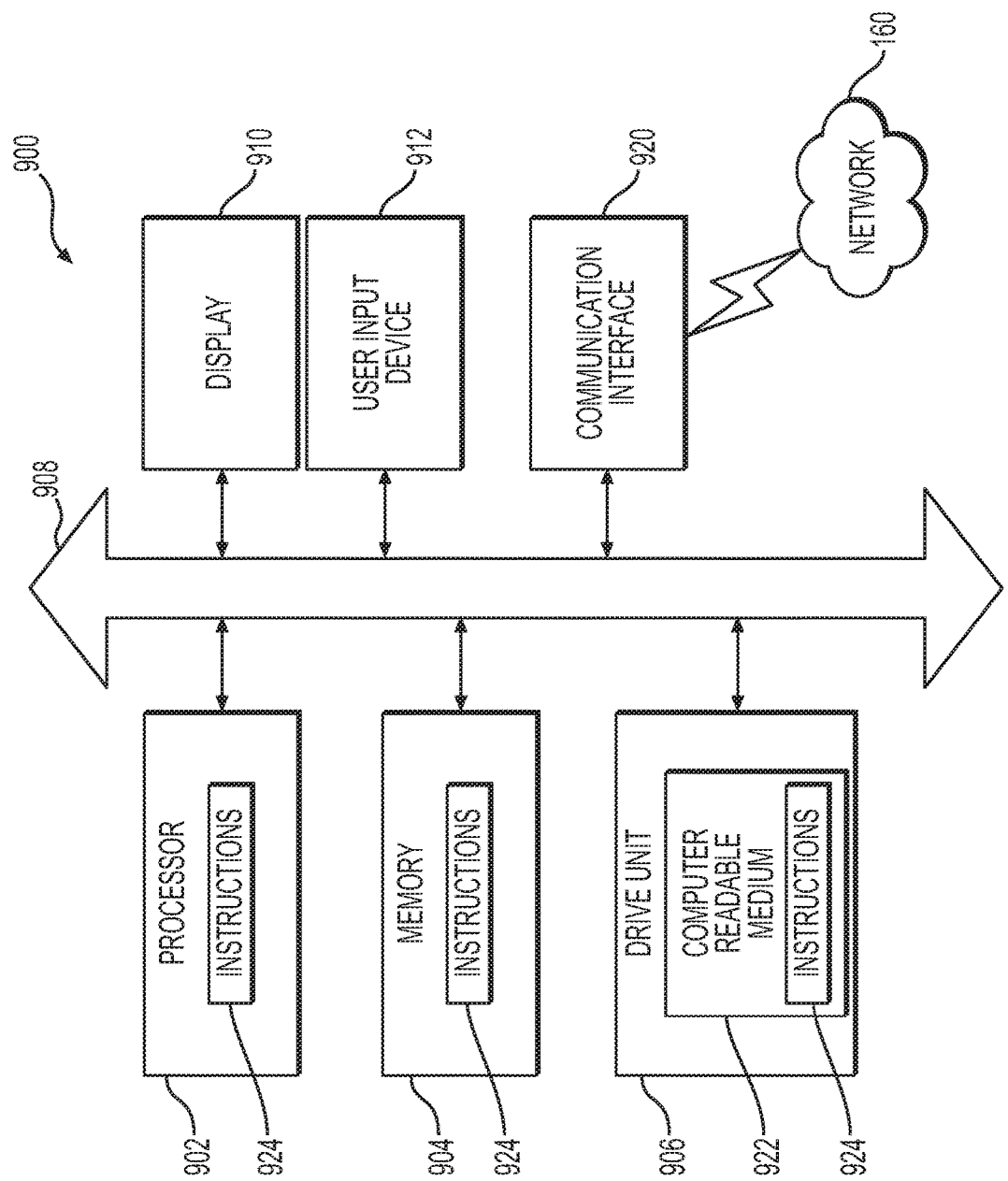
FIG. 9 illustrates an implementation of a computer system that may execute techniques presented herein.

It should be noted that, although the merchant system 150, AR content retrieval server 140, and user device 130 are shown as separate entities in FIG. 1, all or a portion of these components (and the steps performed thereof) may be implemented in a single computing device consistent with or similar to that depicted in FIG. 9. For example, in one embodiment, the AR content retrieval server 140 and user device 130 may be implemented on a single computing device. In another embodiment, the AR content retrieval server 140 and merchant system 150 may be implemented on a single computing device. In yet another embodiment, the merchant system 150, AR content retrieval server 140, and user device 130 may indeed be implemented separately on their respective computing devices. The configurations specifically discussed herein regarding the arrangement of the components depicted in FIG. 1 are merely exemplary, and it would be obvious to a person of ordinary skill in the relevant art that different combinations of components may be implemented on a single or multiple computing devices.

Figure 2:
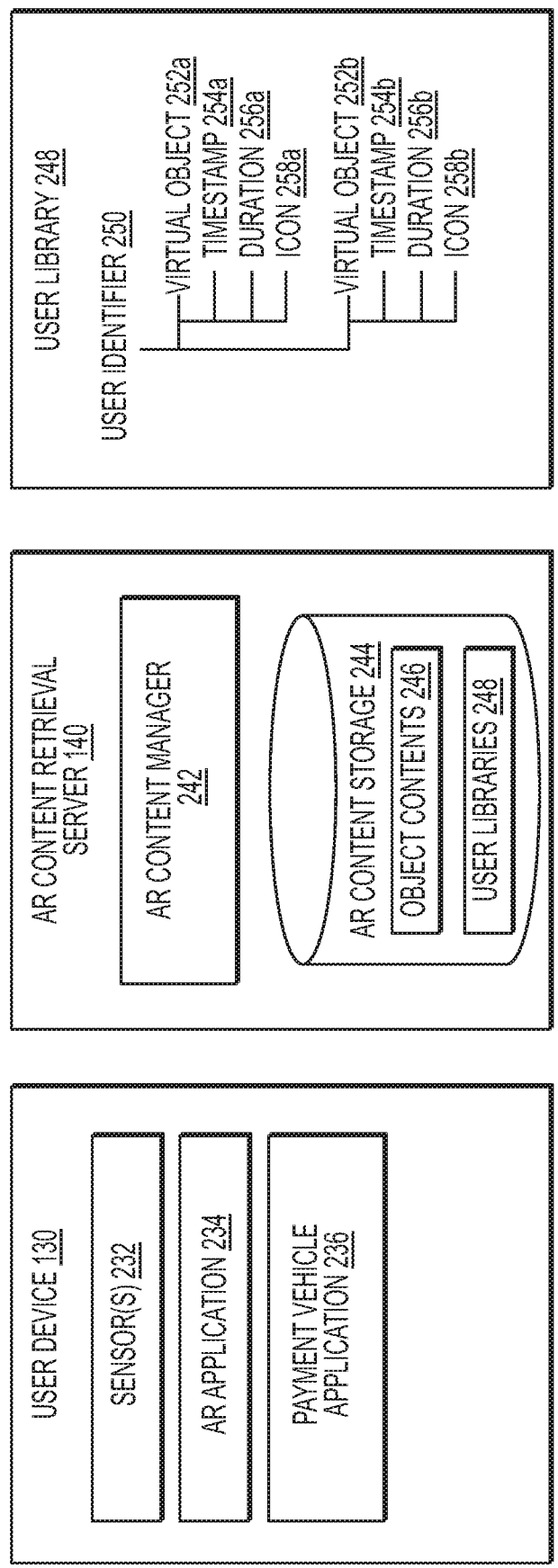
FIG. 2A depicts an exemplary embodiment of a user device, according to one aspect of the present disclosure.
FIG. 2B depicts an exemplary embodiment of an AR content retrieval server, according to one aspect of the present disclosure.
FIG. 2C depicts an exemplary embodiment of a user library, according to one aspect of the present disclosure.

FIG. 2A depicts an exemplary embodiment of a user device 130 according to one aspect of the present disclosure. As disclosed above, the user device 130 may be a computing device consistent with or similar to that depicted in FIG. 9. In addition, the user device 130 may comprise sensor(s) 232, an AR application 234, and a payment vehicle application 236. The payment vehicle application 236 may provide security and encryption (e.g., tokenization, etc.) for personal information needed for electronic transactions. For example, the payment vehicle application 236 may comprise digital wallet systems such as GOOGLE PAY, APPLE PAY, SAMSUNG PAY, PAYPAL, VENMO, etc. In one embodiment and as shown in FIG. 2A, the payment vehicle application 236 may be stored on the client side (i.e. user device 130) and may be fully compatible with electronic commerce websites (i.e., merchant websites). In some embodiments, the payment vehicle application 236 may be on the server side, and may be one that a merchant or an organization creates for/about a user and maintains on its server(s). The personal information retained by the payment vehicle application 236 may comprise a shipping address, a billing address, payment methods, account numbers, expiration dates, security numbers and answers, and any other information needed for authenticating an electronic transaction.

The AR Application 234 may be a single application or a group of applications configured to collect various contextual data using one or more sensors 232 of the user device 130, process the collected contextual data, and provide an AR experience to the user based on the processed contextual data. The sensor(s) 232 may include global positioning system (GPS) sensors, vision sensors (i.e., cameras), audio sensors (i.e., microphones), light sensors, temperature sensors, radio frequency sensors, direction sensors (i.e., magnetic compasses, magnetometers, gyroscopes), and acceleration sensors (i.e., accelerometers). Using a camera of the user device 130, the AR application 234 may receive a visual input that represents the real physical environment, and may identify objects in the captured environment. In one embodiment, the objects may be identified using a machine learning model. The machine learning model techniques used to detect the design elements may comprise any machine learning techniques suitable for detecting objects in visual contents/files, such as documents, images, pictures, drawings, media files, etc. However, other currently-known or later-developed object detection techniques may be used to identify the objects in the captured environment.

One of the machine learning techniques that may be useful and effective for object detection is a convolutional neural network (CNN), which is a type of supervised machine learning. In the CNN, an image data may be input and passed through various convolutional layers and pooling layers. The CNN applies a series of filters to the raw pixel data of the image to extract and learn higher-level features, which the model may then use for classification. Typically, a CNN may be composed of a stack of convolutional modules that perform feature extraction, with each module consisting of a convolutional layer followed by a pooling layer. The last convolutional module may be followed by one or more dense layers that perform classification. The types of the CNN which can be implemented with the embodiments contemplated herein may include a region-based CNN (RCNN), fast RCNN, and faster RCNN.

Nonetheless, it should be noted that other machine learning techniques and frameworks may be used to perform the object detection contemplated by the present disclosure. For example, the detection may be realized using other types of supervised machine learning such as regression problems, random forest, etc., using unsupervised machine learning such as cluster algorithms, principal component analysis (PCA), etc., and/or using reinforcement learning.

With renewed reference to FIG. 2A, the AR application 234 may receive additional contextual data from other sensors of the user device 130, such as, e.g., the GPS sensor, accelerometer, and gyroscope, in order to determine the location, distance, angle, and/or motion of the identified objects relative to the camera of the user device 130, or the location, distance, angle, and/or motion of the camera of the user device 130 relative to the identified objects. Data comprising the determined location, distance, angle, and/or motion may be referred to as location and orientation data in the present disclosure. The AR application 234 may then use the location and orientation data to adjust the size, orientation, and/or placement of virtual contents over the real-world environment displayed in the user device 130. The AR application 234 may then overlay or superimpose the virtual contents over the displayed environment based on the adjusted parameters. The AR application 234 may request the virtual contents from a remote server (e.g., the AR content retrieval server 140), and/or may retrieve the virtual contents from a local storage.

FIG. 2B depicts an exemplary embodiment of an AR content retrieval server 140 according to one aspect of the present disclosure. The AR content retrieval server 140 may be a computing device consistent with or similar to that depicted in FIG. 9. Additionally, the AR content retrieval server 140 may comprise an AR content manager 242 and an AR content storage 244. The AR content manager 242 may be an application configured to receive a request for a virtual content from the AR application 234 of the user device 130. Based on the request, the AR content manager 242 may search for the virtual content in the AR content storage 244. Specifically, the AR content storage 244 may store objet contents 246, which may comprise virtual objects corresponding to the objects captured by the AR application 234 of the user device 130, as well as detailed and/or related information pertaining to the captured objects. The AR content storage 244 may also store one or more user libraries 248 comprising virtual objects and/or icons corresponding to the virtual objects, each user library being associated with a respective user and comprising one or more virtual objects that belong to the user.

FIG. 2C depicts an exemplary embodiment of a user library 248 according to one aspect of the present disclosure. As shown in FIG. 2C, each user library 248 may be a data structure storing a user identifier 250 in association with one or more virtual objects 252a, 252b that belong to the user. Each user library 248 may thus be associated with a user identifier 250 of the corresponding user. The AR content manager 242 may be configured to search for a library of virtual objects that belong to a particular user, using the user identifier of that user. Further, each virtual object (252a or 252b) stored in the user library 248 may in turn be associated with a timestamp (254a or 254b), a duration (256a or 256b), and a corresponding icon (258a or 258b). Use of these data (e.g., timestamp, duration, and icon) will be discussed in greater detail in the following sections.

Figure 3:
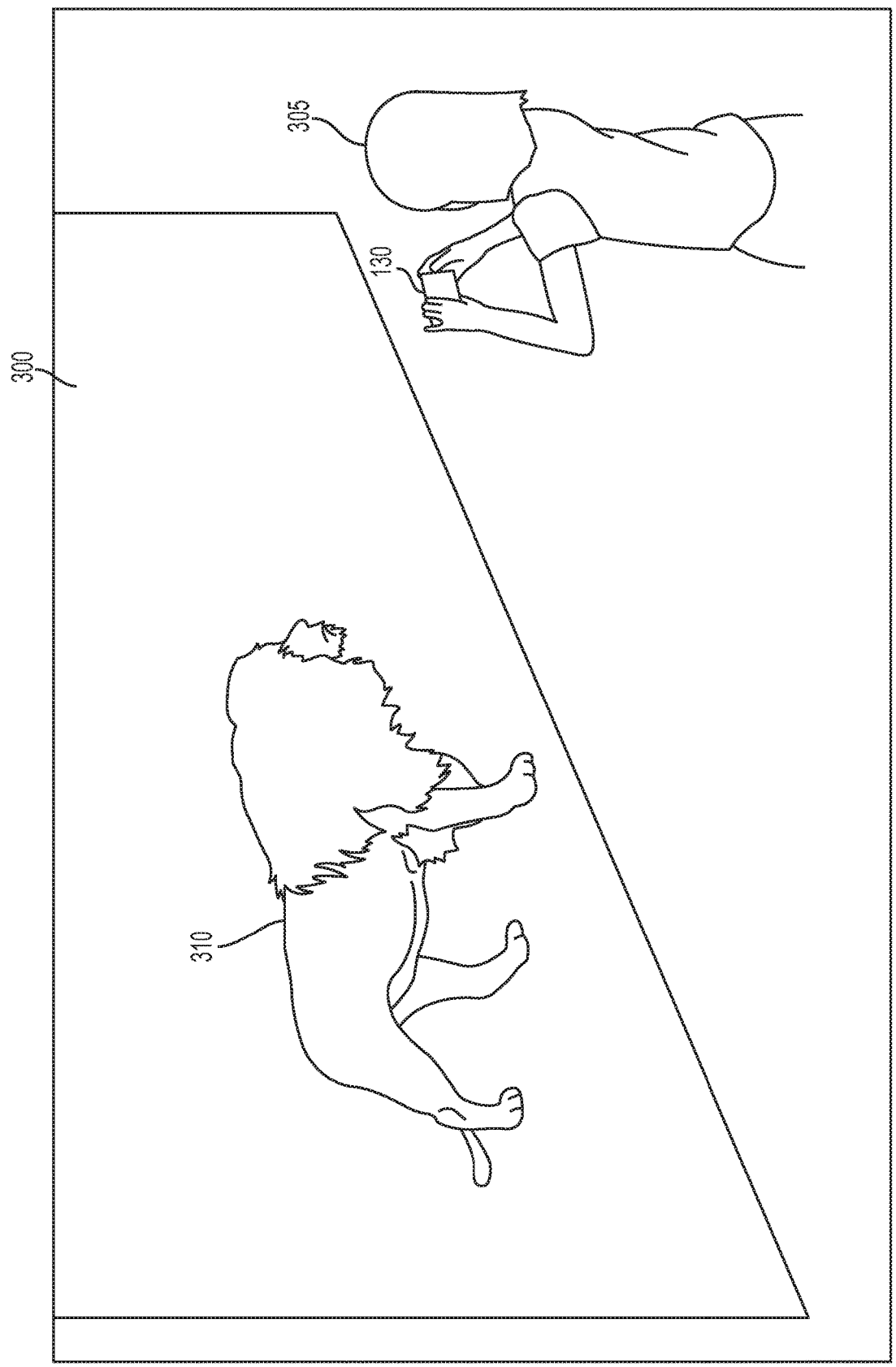
FIG. 3 illustrates an exemplary context in which the techniques presented in the present disclosure may be used.

FIG. 3 illustrates an exemplary context in which the techniques presented in the current disclosure may be used, according to one aspect of the present disclosure. For example, a user 305 may use the user device 130 to capture an image or real-time camera feed of an environment 300 including a lion 310 (i.e., an object 310) at a zoo. The AR application 234 of the user device 130 may augment the displayed environment with additional content pertaining to the lion 310. The types of the additional content and the manner in which the real-world environment is augmented are explained in detail in the following sections. For example, the AR application 234 may be used in conjunction with the payment vehicle application 236 and merchant system 150 to provide an AR-enabled transaction interface. Furthermore, the AR application 234 may be used in conjunction with the AR content retrieval server 140 to enable users to collect virtual objects corresponding to real-world objects detected in the environment.

FIGS. 4A-4J depict exemplary graphical user interfaces (GUIs) presented by the user device 130 for AR-enabled transaction and user collection of virtual objects. Specifically, FIGS. 4A-4J illustrate the GUIs that the AR application 234 working in conjunction with one or more of the payment vehicle application 236, merchant system 150, and AR content retrieval server 140 may render on the user device 130. Further, FIGS. 4A-4F illustrate GUIs rendered by the AR application 234 at a first environment, and FIGS. 4G-4J illustrate GUIs rendered by the AR application 234 at a second environment.

In order to use the AR features contemplated in the current disclosure, the user 305 may need to start and/or login to the AR application 234 to start capturing the surrounding environment for an AR experience. The user 305 may provide login credentials such as, for example, login ID and password, user biometrics data (e.g., fingerprint, iris patterns, facial geometry, voice, etc.), etc. and the login credentials may be used to generate a user identifier associated with that user. In some embodiments, the login credentials themselves may be used as the user identifier. In other embodiments, the login procedure may not be necessary. Instead, the AR application 234 may generate the user identifier based on user biometrics data that are automatically captured using one or more sensors 232 of the user device 130. This way, the user's identity may be verified without requiring the login procedure, by monitoring the user's biometrics data using one or more sensors 232 of the user device 130 periodically, continuously, and/or upon detecting a triggering event (e.g., user's face/eye faces the camera, user's finger touches the fingerprint scanner, etc.). The user biometrics data captured automatically in lieu of the login procedure may be referred to as automatically-captured user biometrics data throughout the present disclosure. Furthermore, if the user 305 is not a first time user, instead of generating a new user identifier, the AR application 234 may identify a previously-generated user identifier of the user 305 based on the login credentials or automatically-captured user biometrics data.

Figure 4A:
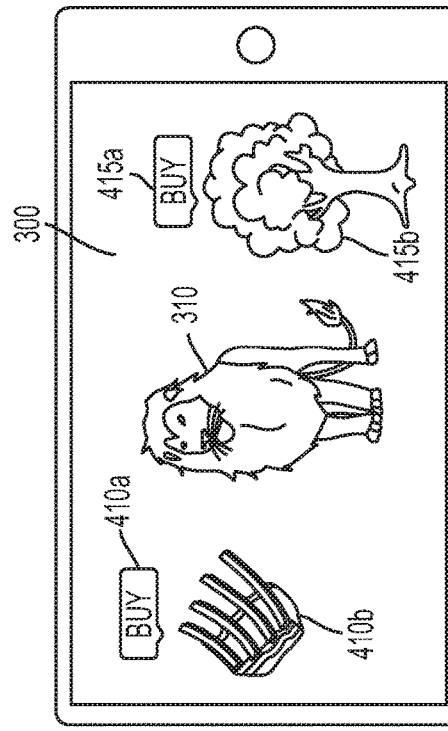
FIGS. 4A-4J depict exemplary graphical user interfaces (GUIs) presented by a user device for AR-enabled transaction and user collection of virtual objects.

In FIG. 4A, the AR application 234 may receive a visual input from a camera of the user device 130, the visual input representing a first environment 300. The AR application 234 may employ object detection techniques to detect the lion 310 (i.e., detect the object 310 and the object type "lion") within the displayed environment 300. Once the AR application 234 detects the lion 310, the AR application 234 may transmit a search request containing the object type (e.g., lion) to the AR content retrieval server 140. The AR content retrieval server 140 may retrieve additional content pertaining to the object type "lion," and transmit the additional content back to the AR application 234. For example, the additional content may comprise information related to items that the user 305 can purchase in order to "sponsor" the lion, and any other information relevant to the lion.

Concurrently to the search step or in response to receiving the additional content from the AR content retrieval server 140, the AR application 234 may determine a position within the display at which the additional content pertaining to the lion 310 may be superimposed/overlaid. As described above, the position may be determined based on contextual data received from one or more sensors of the user device 130, such as a GPS sensor, an accelerometer, a gyroscope, etc. If the additional content comprises discrete portions of information which should be superimposed over the displayed environment 300 separately, the position for each portion of information may be determined based on the contextual data and position determination criterion specific to that portion of information. The aforementioned position determination algorithm may also be used to determine positions of any other user interface elements that may be superimposed/overlaid, such as options or instructions provided to the user 305.

Upon receiving the additional content from the AR content retrieval server 140 (or even prior to receiving the additional content), the AR application 234 may superimpose an option 405 to sponsor the lion 310 at a determined position. The position of the option 405 may be adjusted in real-time based on the contextual data being received iteratively as the user device 130 and/or the detected object 310 moves. In other words, by continuously receiving, processing, and analyzing the visual input and contextual data, the AR application 234 can keep the superimposed/overlaid content adequately aligned with the lion 310. Such real-time adjustment may be applicable to any type of content that is superimposed over a real-world environment (i.e., not limited to the option 405). The user 305 may elect to sponsor the lion 310 by touching or clicking on the option 405, or via voice recognition. For example, the user device 130 may be equipped with a voice recognition application capable of determining whether the user 305 selects or declines the option 405. For example, the user 305 dictating "Sponsor the lion" may mean that the user 305 has selected the option 405.

Figure 4B:
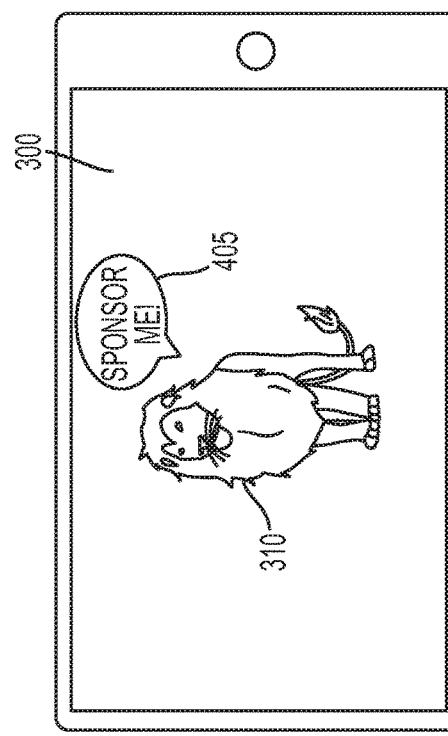

In FIG. 4B, upon the user selecting the option 405, the AR application 234 may display sponsor items that the user 305 can purchase. More specifically, the sponsor items such as, for example, meat 410b and tree 415b, may be superimposed at appropriate positions determined via the position determination algorithm. Further, to receive user selection to purchase the sponsor items 410b and 415b, the AR application 234 may also superimpose "buy" options 410a and 415a at appropriate positions determined via the position determination algorithm.

Figure 4C:
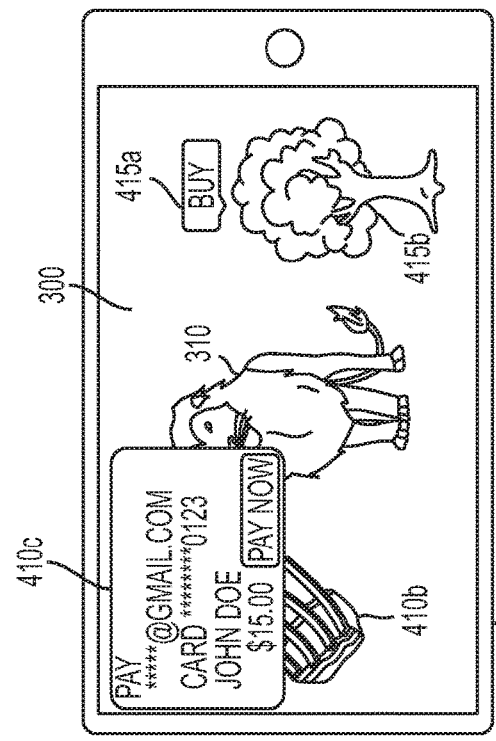

In FIG. 4C, upon the user selecting the option 410a to purchase the meat 410b, the AR application 234 may provide an electronic payment interface via the merchant system 150. As described above, the merchant system 150 may comprise a remote POS terminal 152, which is in communication with the user device 130 and is configured to provide an electronic payment interface to the user device 130 using payment application 154. Although the electronic payment interface may be any one of a web page, web-based application, or an installable mobile application as discussed above, the payment vehicle application 236 of the user device 130 may work in conjunction with the remote POS terminal 152 to carry out an electronic transaction. For example, upon the user selecting the "buy" option 410a, rather than providing an electronic payment interface by way of a web page, web-based application, or an installable mobile application, the payment vehicle application 236 compatible with the remote POS terminal 152 may be initiated. As shown in FIG. 4C, by utilizing data provided from the payment vehicle application 236 (e.g., a digital wallet application), the AR application 234 may superimpose an electronic payment window 410c through which the user 305 may confirm/modify the displayed transaction information (e.g., user information comprising user name, user id, payment account number, etc., which may be retained by the payment vehicle application 236 securely, transaction amount, etc.) and complete the payment in a more convenient and prompt manner. Upon the user selecting the "Pay now" button, the AR application 234 may, by way of the payment vehicle application 236, transmit the transaction information to the merchant system 150 (or the remote POS terminal 152 of the merchant system 150). The merchant system 150 may then generate a transaction authorization request based on the received transaction information, and transmit the transaction authorization request to an acquirer processor server 115.

Figure 4D:
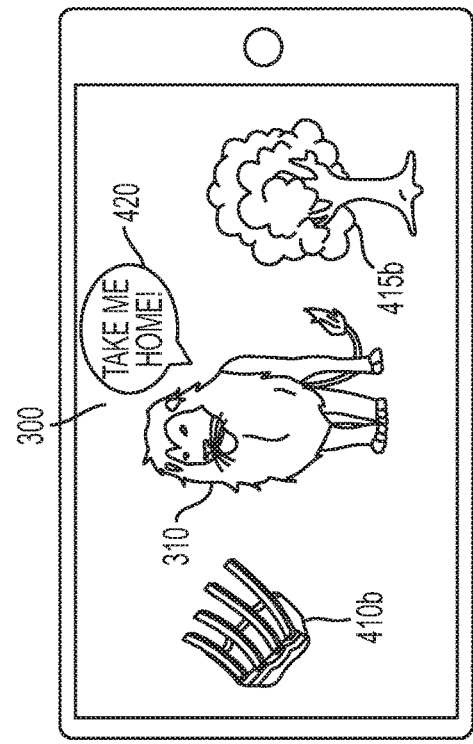

User may continue to purchase sponsor items as shown in FIG. 4D. FIG. 4D shows another electronic payment window 415c superimposed over the environment 300, upon the user selecting the option 415a. As discussed above, the electronic payment window 415c may be generated and superimposed by the AR application 234, based on data provided from the payment vehicle application 236.

Figure 4E:
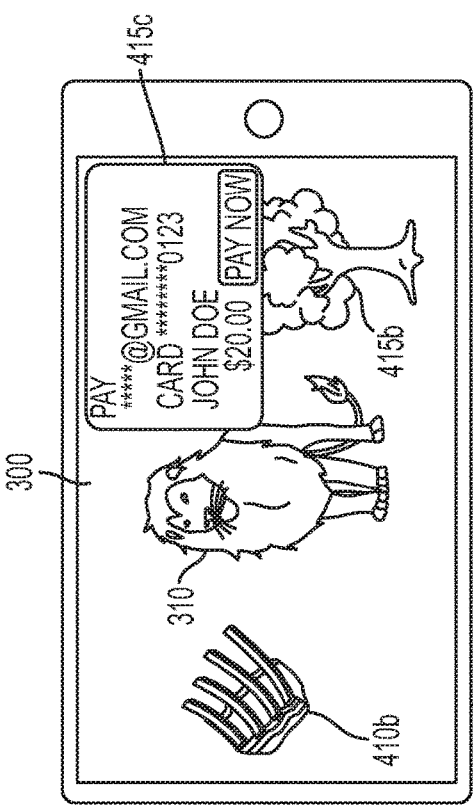
Figure 4F:
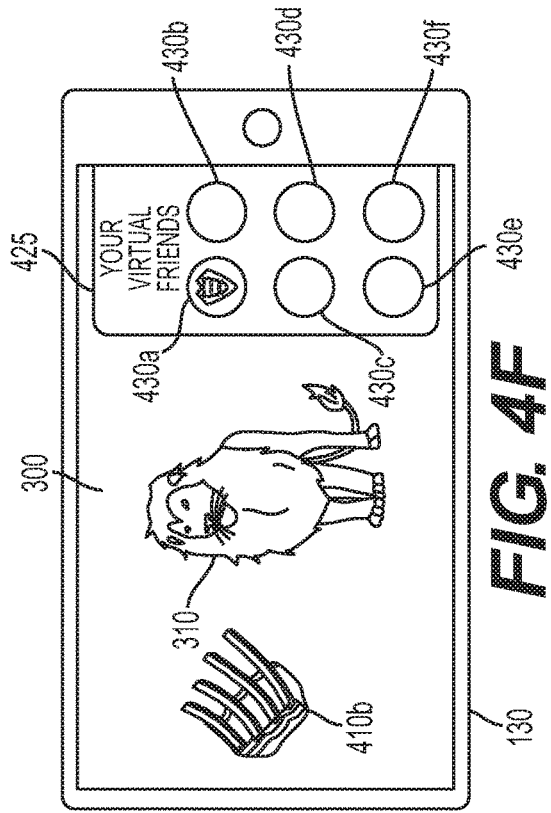

Once an amount equal to or exceeding a predetermined threshold amount has been spent by the user 305 on sponsor items, the AR application 234 may provide the user 305 with an option 420 to "collect" the lion 310, as shown in FIG. 4E. In some embodiments, the AR application 234 may provide the option 420 to "collect" the lion 310 regardless of the amount spent on sponsor items or whether the user has purchased any sponsor items. However, there may be other restrictions or conditions applied against the user 305 if the user 305 is allowed to collect the lion 310 regardless, which will be described in detail in later sections.

If the user elects to "collect" the lion 310 by touching or clicking on the option 420, the AR application 234 may transmit a search request to the AR content retrieval server 140, the search request including the object type previously determined using object detection techniques, along with a user identifier associated with the user 305. This time however, the search request may be to retrieve a virtual object corresponding to the real-world object 310 (e.g., a lion). Such a virtual object may be a three-dimensional or two-dimensional virtual character representative of the real-world object 310. In some embodiments, the virtual object may merely be a three-dimensional rendering of the detected real-world object 310, which may be identical or highly similar to the detected object 310. In other embodiments, the virtual object may be a three-dimensional or two-dimensional animated character representative of the detected objet 310.

As described above, virtual objects corresponding to various real-world objects may be stored in the AR content storage 244 of the AR content retrieval server 140. Upon receiving the search request for the virtual object, the AR content manager 242 may use the object type indicated in the search request to retrieve the virtual object associated with the object type and/or an icon corresponding to the virtual object from the AR content storage 244. The AR content manager 242 may then use the user identifier contained in the search request to determine whether a user library associated with the user 305 exists in the AR content storage 244. If the user library for the user 305 already exists in the AR content storage 244, the AR content manager 242 may add the retrieved virtual object and/or icon to the user library, if the retrieved virtual object and/or icon do not already exit in the user library. A user library may thus include more than one virtual object and/or icon. If the user library for the user 305 does not exist in the AR content storage 244, the AR content manager 242 may generate a user library, associate the user library with the user identifier contained in the search request, and add the retrieved virtual object and/or icon to the user library. The newly-generated user library may then be stored in the AR content storage 244. In essence, a user library links virtual object(s) retrieved for a user (i.e., virtual object(s) that belong to a user) and corresponding icon(s) with a user identifier of that user.

The entire user library, or one or more virtual objects and/or icons contained in the user library, may then be returned to the AR application 234 of the user device 130. The virtual object(s) and corresponding icon(s) may then be stored in association with the user identifier in a local storage of the user device 130. The virtual object(s) and corresponding icon(s) stored at the user device 130 may thus resemble the user library stored in the AR content storage 244. In other words, the data stored in the local storage of the user device 130 may be in sync with the user library stored in the AR content storage 244, such that it may be unnecessary for the AR application 234 to contact the AR content storage 244 every time a virtual object and/or icon are to be rendered/displayed by the AR application 234.

In some embodiments, the virtual objects and corresponding icons associated with the user 305 (i.e., stored in the user library) may be valid only for a certain amount of time depending on the amount of money spent by the user 305 on sponsor items. For instance, each virtual object and its corresponding icon may be associated with a timestamp indicative of the date they were created and/or added to the user library, and another timestamp or value that indicates how long the virtual object and the icon are valid for. In another embodiment, each virtual object and its corresponding icon may be associated with an expiration date and/or time. The timestamp(s) and/or expiration date/time may be stored in the user library in association with the corresponding virtual character and/or icon. To that end, the search request for the virtual object may contain, in addition to the user identifier and object type, a transaction amount, which the AR content manager 242 may use to determine the timestamp(s) and/or expiration date/time for the virtual object. Based on the timestamp(s) and/or expiration date/time, the AR application 234 may monitor when each virtual object expires, and provides a notification to the user when the virtual object expires. The AR application 234 may also display an option for the user 305 to purchase additional sponsor items (in manners similar to those illustrated in FIGS. 4B-4D) and modify the timestamp(s) and/or expiration date/time based on the additional purchase(s). If the user decides not to purchase additional sponsor items, the virtual object may become expired and be removed from the user library.

The AR application 234 may display a side pane or side bar 425 containing the icon(s) 430a-430e of the virtual object(s) that have been collected by the user 305. From a user experience standpoint, upon the user 305 selecting the option 420 to collect the lion 310, the side pane 425 may appear briefly to confirm collection by showing the icon 430a (along with icon(s) representative of any other virtual object(s) that have been collected by the user 305) and may fold back to the side of the screen in order not to obstruct the entire screen view. However, a small tab may remain on the side of the screen, which the user 305 can touch and swipe to the other side to re-open/expand the side pane 425.

Figure 4H:
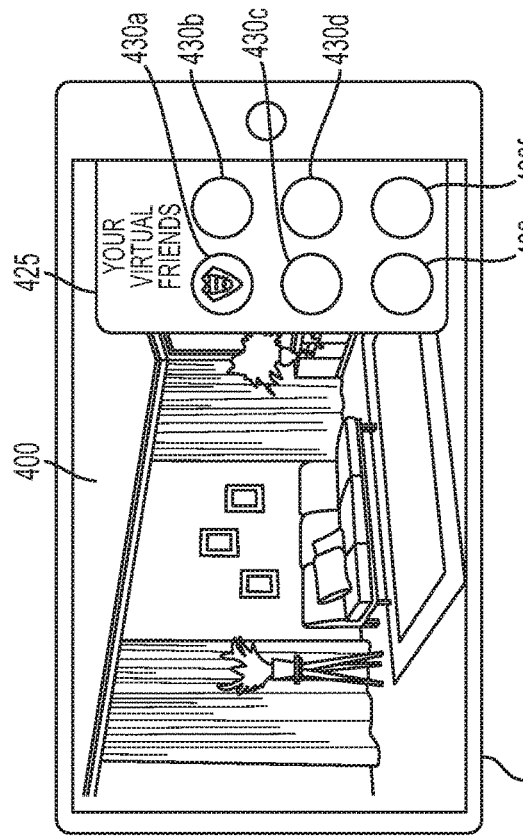
Figure 4G:
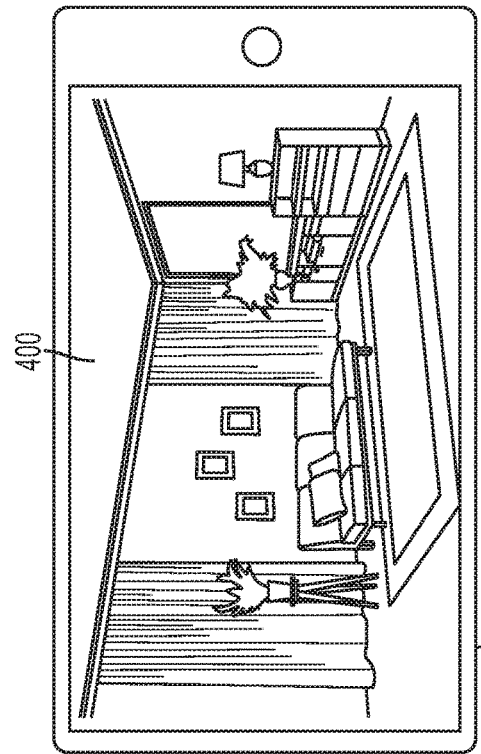

In FIG. 4G, the AR application 234 may receive a visual input from the camera of the user device 130, the visual input representing a second environment 400. The second environment 400 may be the same or different from the first environment 300. In FIG. 4G, the second environment 400 is shown to be different from the first environment 300. For example, the second environment 400 may be an interior of a home while the first environment was an enclosure at a zoo. At the second environment 400, the user 305 may have logged out of the AR application 234 and logged back in, which may have required the user 305 to provide the login credentials again. In this case, the AR application 234 may receive the login credentials, and verify that the user 305 is associated with a user identifier based on the login credentials. The AR application 234 may then retrieve the user identifier of the user 305. Using the user identifier, the AR application 234 may retrieve the user library containing the virtual object(s) collected by the user 305 and corresponding icon(s) from the local storage (or from the AR content storage 244, alternatively), and display the side pane 425 containing the icon(s) 430a-430e. In case the user remains logged in from the first to the second environment, the steps for verifying the user identify based on login credentials may not be necessary. Further, in case the AR application 234 does not require the login procedure and may instead rely on automatically-captured user biometrics data for user verification, the AR application 234 may receive user biometrics data from one or more sensor(s) of the user device 130, use the received user biometrics data to find a matching user identifier. Using the user identifier, the AR application 234 may retrieve the user library and display the side pane 425 containing the icon(s) 430a-430e. FIG. 4H shows the side pane 425 displayed over the second environment 400.

Figure 4I:
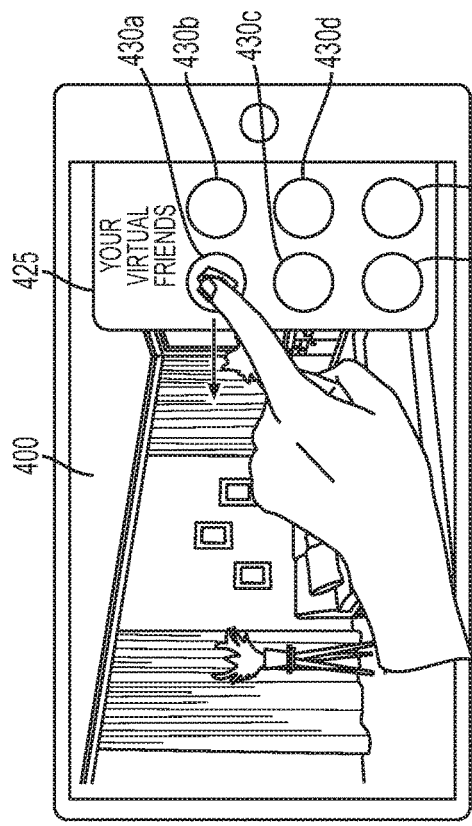
Figure 4J:
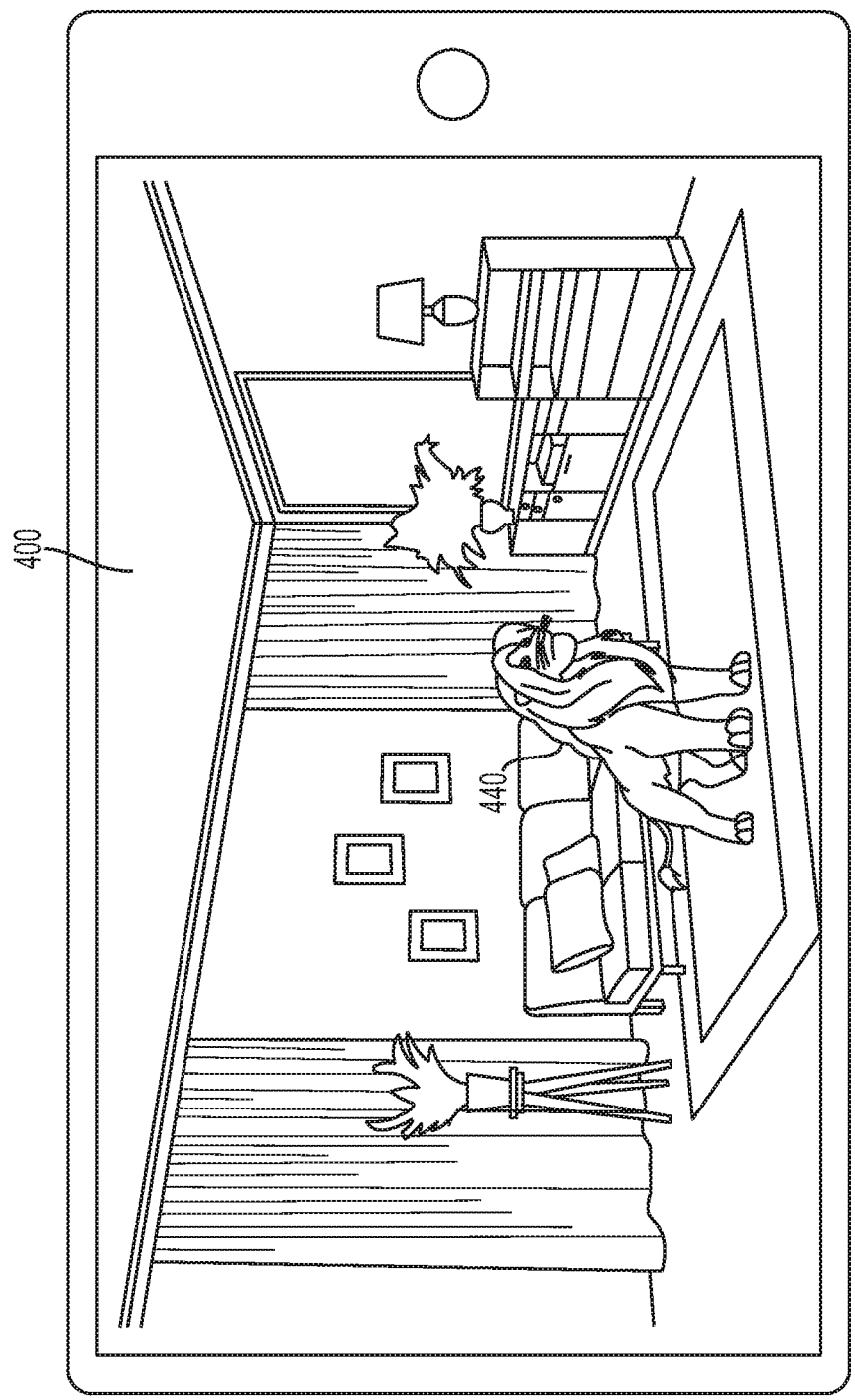

As shown in FIG. 4I, the user 305 may then select an icon, for instance the icon 430a from the side pane 425, and drag and drop the icon 430a onto the second environment 400. Once the icon 430a is dropped onto the second environment 400, the icon 430a may turn into a virtual object 440 with or without transition animations, as shown in FIG. 4J. As described above, the virtual object 440 may be a two-dimensional or three-dimensional rendering or animated character of the real-world object 310. The virtual object 440 added to the second environment 400 may be mobile within the captured environment 400 and may perform certain movements or expressions to the entertainment of the user 305. Further, the user 305 may be able to select the virtual object 440 to view additional information such as, for example, sponsor items and amount that have been donated, general information about the virtual object 440 (i.e., object 310), the location at which the virtual object 440 (i.e., object 310) was collected, remaining usage time, related objects that the user 305 may be interested, etc.

In some embodiments, such as when the user 305 was previously given the option to collect the lion 310 without making any purchase, the user 305 may be presented with an option to purchase one or more sponsor items (in manners similar to those illustrated in FIGS. 4B-4D) when the user 305 attempts to drop the icon 430a-430f onto the second environment 400. If the user 305 decides not to make any purchase at that point, the AR application 234 may present a notification to the user 305 that purchase of a sponsor item is needed to add the virtual object to the second environment 400. If the user 305 makes a purchase, the AR application 234 may then add the virtual object to the second environment 400.

FIG. 5 is a flowchart of an exemplary method of collecting and releasing a virtual object between disparate environments, according to one aspect of the present disclosure. Notably, method 500 may be performed by the AR application 234 of the user device 130. In some embodiments, method 500 may be performed by the AR application 234 of the user device 130, in part in conjunction with the payment vehicle application 236. At step 510, the AR application 234 may receive login credential(s) or automatically-captured user biometrics data of the user. At step 512, the AR application 234 may generate a user identifier of the user based on the login credential(s) or automatically-captured user biometrics data. If the user is not a first-time user however, the AR application 234 may retrieve a previously-generated user identifier based on the login credential(s) or automatically-captured user biometrics data. At step 514, the AR application 234 may display a first environment (e.g., first environment 300 illustrated in FIGS. 4A-4F) based on a visual input received from a camera of the user device 130. At step 516, the AR application 234 may identify an object in the first environment using object detection techniques such as, for example, convolutional neural networks. At step 518, the AR application 234 may determine the type of the identified object (i.e., object type). The type may be identified by a trained machine learning model such as the convolutional neural networks discussed above, which may be configured to distinguish between various objects based on visual features and classify each object under a object type or object name. At step 520, the AR application 234 may transmit, to a server (i.e., AR content retrieval server 140 illustrated in FIG. 2B), a search request for content related to the object, the search request including the object type.

The search request may be further processed by the AR content retrieval server 140 before a search response is returned to the AR application 234. FIG. 6 is a flowchart of an exemplary method of processing the search request received from the AR application 234, according to one aspect of the present disclosure. At step 610, the AR content manager 242 may receive, from the user device 130, the search request for content pertaining to the object. As discussed above, the search request may indicate the type of the object. At step 615, the AR content manger 242 may search the AR content storage 244 for content pertaining to the object, using the object type indicated in the search request. Specifically, the content may be AR content that may be overlaid or superimposed over a displayed environment. At step 620, the AR content manager 242 may retrieve the content pertaining to the object from the AR content storage 244. At step 625, the AR content manager 242 may transmit the retrieved content back to the user device 130.

With renewed reference to FIG. 5, at step 522, the AR application 234 may receive the content pertaining to the object from the AR content retrieval server 140. At step 524, the AR application 234 may overlay/superimpose at least a portion of the received content over the first environment. As discussed above in reference to FIGS. 4A-4B, the overlaid/superimposed content may include additional information about the identified object, an option to sponsor the object, sponsor item(s), option(s) to purchase sponsor item(s), etc. At step 526, the AR application 234 may receive user selection to initiate an electronic transaction. For example, as discussed above in reference to FIGS. 4B-4C, the user may select the option to purchase a sponsor item. At step 528, the AR application 234 may present a transaction interface (e.g., electronic payment window 410*c*, 415*c* in FIGS. 4C-4D). As described above, the AR application 234 may work in conjunction with the payment vehicle application 236 to present the transaction interface. The transaction interface may allow the user to confirm/modify the displayed transaction information and make an electronic payment. At step 530, the AR application 234 may receive transaction information via the transaction interface. At step 535, the AR application 234 may transmit the transaction information to a merchant system (i.e., merchant system 150 in FIG. 1).

The transaction information may be received and processed by the merchant system 150 to obtain a transaction authorization from a financial institution. FIG. 7 is a flowchart of an exemplary method of processing the transaction information at the merchant system 150, according to one aspect of the present disclosure. At step 710, the merchant system 150 may receive the transaction information from the user device 130. At step 715, the merchant system 150 may transmit a transaction authorization request to an acquirer processor server (i.e., acquirer processor server 115 in FIG. 1). The transaction authorization request may be generated based on the transaction information received from the user device 130, and may comprise information needed by downstream entities (e.g., acquirer processor server 115, payment network 120, financial institution 125) to route and/or authorize the transaction. At step 720, the merchant system 150 may receive a transaction authorization response from the acquirer processor server 115. At step 725, the merchant system 150 may transmit the transaction authorization response to the user device 130.

With renewed reference to FIG. 5, at step 534, the AR application 234 may receive the transaction authorization response from the merchant system 150. At step 536, the AR application 234 may overlay/superimpose an option to collect the object over the first environment (e.g., option 420 in FIG. 4E). At step 538, the AR application 234 may receive user selection to collect the object. At step 540, the AR application 234 may transmit a search request for a virtual object to the AR content retrieval server 140. The search request may include the user identifier and object type determined in previous steps 512 and 518, respectively. In some embodiments, the search request may additionally include a transaction amount based on the sponsor item(s) purchased.

The search request may be further processed by the AR content retrieval server 140 before a search response is returned to the AR application 234. FIG. 8 is a flowchart of an exemplary method of processing the search request received from the AR application 234, according to one aspect of the present disclosure. At step 810, the AR content manager 242 may receive the search request from the user device 130. As discussed above, the search request may include the user identifier of the user and the object type. At step 815, the AR content manager 242 may search the AR content storage 244 for a virtual object corresponding to the object. The AR content manager 242 may use the object type indicated in the search request to retrieve the virtual object from the AR content storage 244. At step 820, the AR content manger 242 may retrieve the virtual object from the AR content storage 244. The AR content manager 242 may also retrieve an icon corresponding to the virtual object from the AR content storage 244. At step 825, the AR content manager 242 may add the virtual and/or corresponding icon to a user library associated with the user.

As discussed above, the AR content manager 242 may first determine whether a user library associated with the user identifier already exists in the AR content storage 244. Based on this determination, the user library may be retrieved from the AR content storage 244 if there is a previously-generated user library, or the user library may be newly generated if there is no previously-generated user library associated with the user. The user library may associate the user identifier of the user with the virtual object and/or corresponding icon. In some embodiments, the AR content manager 242 may also determine timestamp(s) or expiration date/time indicative of how long the virtual object is valid for, based on the transaction amount included in the search request. Then, the AR content manager 242 may store the timestamp(s) or expiration date/time in association with the corresponding virtual object within the user library.

At step 830, the AR content manager 242 may transmit the retrieved virtual object to the user device 130. Alternatively, the AR content manager 242 may send the entire user library associated with the user to the user device 130, if the user device 130 does not already have a copy of the user library stored in a local storage. In other words, if the user device 130 already has a local copy of the user library, the AR content manager 242 may only transmit the retrieved virtual object and/or corresponding icon to the user device 130, such that the user device 130 may update the local copy with the retrieved virtual object and/or corresponding icon. On the other hand, if the user device 130 does not have a local copy of the user library, the AR content manager 242 may transmit the entire user library to the user device 130, such that the user device 130 may retain a copy of the user library locally, which may be updated incrementally as additional virtual objects are collected by the user.

With renewed reference to FIG. 5, at step 542, the AR application 234 may receive the virtual object, or the user library containing the virtual object if the user device 130 does not already have a local copy of the user library, from the AR content retrieval server 140. At step 544, the AR application 234 may store the virtual object in a user library associated with the user identifier in the local storage. As alluded to above, if the local storage does not have a copy of the user library, the AR application 234 may instead receive the entire user library containing the virtual object from the AR content retrieval server 140 and store the received user library as a local copy.

At step 546, the AR application 234 may display a second environment (e.g., second environment 400 illustrated in FIGS. 4G-4J) based on a visual input received from the camera of the user device 130. At step 548, the AR application 234 may determine that the current user is associated with the user identifier generated at step 512 (meaning the user has remained the same). As discussed above in reference to FIGS. 4G-4H, the determination may be based on matching login credentials or automatically-captured user biometrics data (or a user identifier derived therefrom) of the current user to the user identifier generated at step 512.

It should be noted that method 500 may still proceed to subsequent steps even if the AR application 234 determines that the current user is not associated with the user identifier generated at step 512 (meaning the user has changed). If the AR application 234 determines that the current user's login credentials or automatically-captured biometrics data (or a user identifier derived therefrom) do not match with the user identifier generated at step 512, the AR application 234 may determine a user identifier associated with the current user based on the current' user's login credentials or automatically-captured user biometrics data. That user identifier may be used to locate the corresponding user library from which virtual object(s) collected by the current user may be retrieved.

Once the AR application 234 determines that the user is associated with the user identifier, at step 550, the AR application 234 may retrieve the user library associated with the user identifier. At step 552, the AR application may present, over the second environment, a menu comprising one or more icons corresponding to one or more virtual objects stored in the user library. The one or more icons may comprise an icon corresponding to the virtual object collected by the user at step 538. At step 554, the AR application 234 may receive user selection to add the virtual object to the second environment. The user selection may comprise the user dragging the icon corresponding the virtual object to a desired location within the second environment, and dropping the icon onto the desired location, as discussed above in reference to FIG. 4I. Responsive to this user selection, at step 556, the AR application 234 may add the virtual object to the second environment. In other words, the virtual object may be overlaid or superimposed over the displayed second environment, as discussed above in reference to FIG. 4J.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 9 illustrates an implementation of a general computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 900 can be implemented using electronic devices that provide voice, video, or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 904 includes a cache or random-access memory for the processor 902. In alternative implementations, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 900 may further include a display unit 910, such as a liquid crystal display (LCD), an organic light emitting diode (OLED), a flat panel display, a solid-state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 906.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control, or any other device operative to interact with the computer system 900.

The computer system 900 may also or alternatively include a disk or optical drive unit 906. The disk drive unit 906 may include a computer-readable medium 922 in which one or more sets of instructions 924, e.g. software, can be embedded. Further, the instructions 924 may embody one or more of the methods or logic as described herein. The instructions 924 may reside completely or partially within the memory 904 and/or within the processor 902 during execution by the computer system 900. The memory 904 and the processor 902 also may include computer-readable media as discussed above.

In some systems, a computer-readable medium 922 includes instructions 924 or receives and executes instructions 924 responsive to a propagated signal so that a device connected to a network 160 can communicate voice, video, audio, images, or any other data over the network 160. Further, the instructions 924 may be transmitted or received over the network 160 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 160, external media, the display 910, or any other components in system 900, or combinations thereof. The connection with the network 160 may be a physical connection, such as a wired Ethernet connection or may be established wirelessly as discussed below. Likewise, the additional connections with other components of the system 900 may be physical connections or may be established wirelessly. The network 160 may alternatively be directly connected to the bus 908.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 922 may be non-transitory, and may be tangible.

The computer-readable medium 922 can include a solid-state memory such as a memory card or other package that houses one or more non-volatile read-only memories. The computer-readable medium 922 can be a random-access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 160. The network 160 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 160 may include wide area networks (WAN), such as the Internet, local area networks (LAN), campus area networks, metropolitan area networks, a direct connection such as through a Universal Serial Bus (USB) port, or any other networks that may allow for data communication. The network 160 may be configured to couple one computing device to another computing device to enable communication of data between the devices. The network 160 may generally be enabled to employ any form of machine-readable media for communicating information from one device to another. The network 160 may include communication methods by which information may travel between computing devices. The network 160 may be divided into sub-networks. The sub-networks may allow access to all of the other components connected thereto or the sub-networks may restrict access between the components. The network 160 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for collecting and releasing virtual objects between disparate augmented reality (AR) environments, comprising:
   authenticating a user identifier of a user, wherein the user identifier is generated based, at least in part, on biometric data of the user received from a sensor of a device;
   displaying, at a first time, a first environment comprising an object based, at least in part, on a visual input received from the sensor of the device;
   receiving, via a user interface of the device, a user selection to collect the object;
   transmitting, to an AR content server, a search request for a virtual object corresponding to the object, wherein the search request includes object data and the user identifier;
   retrieving, from the AR content server, the virtual object based, at least in part, on the object data;
   storing the virtual object in a user library associated with the user identifier upon determining the retrieved virtual object is missing in the user library;
   displaying, at a second time, a second environment;
   receiving user selection to add the virtual object and user interface elements indicating information related to the virtual object to the second environment; and
   superimposing the virtual object and the user interface elements over the second environment, wherein position of the virtual object and the user interface elements are adjusted in real-time based on contextual data and position data received from the sensor of the device.

2. The method of claim 1, wherein the first environment and the second environment are different.

3. The method of claim 1, wherein authenticating the user identifier is performed periodically and comprises:
   periodically capturing, via the sensor of the device, the biometrics data; and
   periodically matching the captured biometrics data to the user identifier.

4. The method of claim 1, wherein the user identifier of the user is further generated based on login credentials.

5. The method of claim 4, wherein authenticating the user identifier further comprises:
   receiving the login credentials or the biometrics data captured without a login; and
   matching the received login credentials or the biometrics data to the user identifier.

6. The method of claim 1, further comprising:
   prior to receiving the user selection to add the virtual object to the second environment:
      retrieving a user library associated with the user based on the user identifier, the user library storing one or more virtual objects collected by the user in association with the user identifier; and
      presenting, over the second environment, a menu comprising one or more icons corresponding to the one or more virtual objects stored in the user library, the one or more virtual objects including the virtual object.

7. The method of claim 6, wherein the user selection to add the virtual object to the second environment comprises: dragging and dropping an icon corresponding to the virtual object onto the second environment.

8. The method of claim 1, further comprising:
   prior to receiving the user selection to collect the object:
      superimposing content pertaining to the object over the first environment;
      receiving user selection to initiate a transaction related to the object;
      superimposing an electronic payment window over the first environment;
      receiving transaction information from the user;
      transmitting, to a merchant system, the transaction information;
      receiving, from the merchant system, a transaction authorization response; and
      superimposing an option to collect the object over the first environment.

9. The method of claim 8, wherein the electronic payment window is superimposed over the first environment by way of a digital wallet application.

10. The method of claim 8, wherein the transaction information comprises an account number, wherein the account number is encrypted.

11. The method of claim 8, wherein the content pertaining to the object comprise one or more of: additional information about the object, one or more animations for the object, one or more sponsor items for the object.

12. The method of claim 11, wherein receiving the user selection to initiate the transaction related to the object comprises receiving user selection to purchase at least one of the one or more sponsor items for the object.

13. A system for collecting and releasing virtual objects between disparate augmented reality (AR) environments, the system comprising:
   one or more processors;
   a data storage comprising instructions which, when executed by the one or more processors, cause the one or more processors to perform a method comprising:
      authenticating a user identifier of a user, wherein the user identifier is generated based, at least in part, on biometric data of the user received from a sensor of a device;
      displaying, at a first time, a first environment comprising an object based, at least in part, on a visual input received from the sensor of the device;
      receiving, via a user interface of the device, a user selection to collect the object;
      transmitting, to an AR content server, a search request for a virtual object corresponding to the object, wherein the search request includes object data and the user identifier;
      retrieving, from the AR content server, the virtual object based, at least in part, on the object data;
      storing the virtual object in a user library associated with the user identifier upon determining the retrieved virtual object is missing in the user library;
      displaying, at a second time, a second environment;
      receiving user selection to add the virtual object and user interface elements indicating information related to the virtual object to the second environment; and superimposing the virtual object and the user interface elements over the second environment, wherein position of the virtual object and the user interface elements are adjusted in real-time based on contextual data and position data received from the sensor of the device.

14. The system of claim 13, wherein the method further comprises:
prior to receiving the user selection to add the virtual object to the second environment:
retrieving a user library associated with the user based on the user identifier, the user library storing one or more virtual objects collected by the user in association with the user identifier; and
presenting, over the second environment, a menu comprising one or more icons corresponding to the one or more virtual objects stored in the user library, the one or more virtual objects including the virtual object.

15. The system of claim 13, wherein the first environment and the second environment are different.

16. The system of claim 13, wherein authenticating the user identifier is performed periodically and comprises:
periodically capturing, via the sensor of the device, the biometrics data; and
periodically matching the captured biometrics data to the user identifier.

17. The system of claim 13, wherein the method further comprises:
prior to receiving the user selection to collect the object:
superimposing content pertaining to the object over the first environment;
receiving user selection to initiate a transaction related to the object;
superimposing an electronic payment window over the first environment;
receiving transaction information from the user;
transmitting, to a merchant system, the transaction information;
receiving, from the merchant system, a transaction authorization response; and
superimposing an option to collect the object over the first environment.

18. The system of claim 17, wherein the content pertaining to the object comprise one or more of: additional information about the object, one or more animations for the object, one or more sponsor items for the object.

19. The system of claim 18, wherein receiving the user selection to initiate the transaction related to the object comprises receiving user selection to purchase at least one of the one or more sponsor items for the object.

20. A non-transitory computer readable medium for collecting and releasing virtual objects between disparate augmented reality (AR) environments, the non-transitory computer readable medium comprising instructions which, when executed by one or more processors, cause the one or more processors to perform a method comprising:
authenticating a user identifier of a user, wherein the user identifier is generated based, at least in part, on biometric data of the user received from a sensor of a device;
displaying, at a first time, a first environment comprising an object based, at least in part, on a visual input received from the sensor of the device;
automatically detecting the object from the first environment based on object detection techniques;
transmitting, to an AR content server, a search request for a virtual object corresponding to the object, wherein the search request includes object data and the user identifier;
retrieving, from the AR content server, the virtual object based, at least in part on the object data;
storing the virtual object in a user library associated with the user identifier upon determining the retrieved virtual object is missing in the user library; and
displaying, at a second time, the virtual object and user interface elements indicating information related to the virtual object superimposed on a second environment, wherein position of the virtual object and the user interface elements are adjusted in real-time based on contextual data and position data received from the sensor of the device.

* * * * *